United States Patent
Lipchuk et al.

(10) Patent No.: US 9,081,682 B2
(45) Date of Patent: Jul. 14, 2015

(54) VIRTUAL MACHINE INSTALLATION IMAGE CACHING

(71) Applicant: Red Hat Israel, Ltd., Raanana (IL)

(72) Inventors: Maor Lipchuk, Rishon Letzion (IL); Omer Frenkel, Tel Aviv (IL); Livnat Peer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 220 days.

(21) Appl. No.: 13/725,304

(22) Filed: Dec. 21, 2012

(65) Prior Publication Data

US 2014/0108722 A1 Apr. 17, 2014

Related U.S. Application Data

(60) Provisional application No. 61/714,105, filed on Oct. 15, 2012.

(51) Int. Cl.
*G06F 12/16* (2006.01)
*G06F 12/08* (2006.01)
*G06F 9/455* (2006.01)
*G06F 11/14* (2006.01)

(52) U.S. Cl.
CPC ............ *G06F 12/08* (2013.01); *G06F 9/45558* (2013.01); *G06F 11/1446* (2013.01); *G06F 2009/45562* (2013.01)

(58) Field of Classification Search
CPC . G06F 12/0866; G06F 3/067; G06F 11/1446; G06F 9/45558; G06F 2009/45562
USPC .......................................... 711/113, 161, 162
See application file for complete search history.

(56) References Cited

U.S. PATENT DOCUMENTS

| | | | |
|---|---|---|---|
| 2009/0313447 A1* | 12/2009 | Nguyen et al. | 711/162 |
| 2011/0145199 A1* | 6/2011 | Prasad Palagummi | 707/654 |
| 2013/0318301 A1* | 11/2013 | Chen et al. | 711/119 |
| 2014/0095816 A1* | 4/2014 | Hsu et al. | 711/162 |

* cited by examiner

*Primary Examiner* — Than Nguyen
(74) *Attorney, Agent, or Firm* — Lowenstein Sandler LLP

(57) ABSTRACT

The subject matter of this specification can be implemented in, among other things, a computer-implemented method including sending, from a virtual desktop server manager at a data center and over a network, at least one request to a virtual machine storage domain for virtual machine installation images. The virtual machine storage domain stores the virtual machine installation images separate from the data center. The method further includes receiving, from the virtual machine storage domain over the network, the virtual machine installation images. The method further includes caching the virtual machine installation images in a data storage domain within the data center. The method further includes receiving a request to present a list of the virtual machine installation images. The method further includes in response to receiving the request to present the list, presenting the list of the cached virtual machine installation images.

21 Claims, 3 Drawing Sheets

VIRTUAL MACHINE INSTALLATION IMAGE CACHING

RELATED APPLICATION

This application claims benefit of U.S. Provisional Patent Application No. 61/714,105, filed Oct. 15, 2012, which is incorporated herein by reference.

TECHNICAL FIELD

This instant specification relates to caching virtual machine installation images.

BACKGROUND

An enterprise virtualization platform generally includes multiple hosts and at least one manager. Each host has an operating system and a virtual desktop server manager (VDSM). Each VDSM manages the installation of virtual machines on the hosts. Virtual machines are that perform the same functions as physical machines. A virtual machine (VM) is a software implementation of a machine (e.g., a computing device) that executes programs like a physical machine. In some cases, a user can access the virtual machine running on the host over a network through a web interface.

In an enterprise virtualization platform, the VDSM can install a virtual machine on a host by retrieving an ISO image for the virtual machine from an ISO storage domain. The ISO image may be, for example, an installation image or file specified by the ISO 9660 file system for compact disc read-only memory (CD-ROM) media. The ISO 9660 file system is published by the International Organization for Standardization (ISO). The ISO image may also be an installation image or file specified by the Universal Disk Format (UDF) file system, also referred to as ISO/IEC 13346.

DETAILED DESCRIPTION

This document describes systems and techniques for caching virtual machine installation images, such as ISO images. The system is an enterprise virtualization platform that stores the ISO images for the virtual machines in a centralized location, such as an ISO storage domain. The ISO storage domain can provide the ISO images to multiple data centers. The data centers include hosts that run the virtual machines. The hosts and/or another computing device can cache one or more of the ISO images and/or a list of available ISO images. In some implementations, caching the ISO images and/or the list of available ISO images may reduce the amount of time that a user takes to present the list of ISO images, the amount of time to initiate a new instance of a virtual machine for a particular ISO image, and/or the number of requests sent to the ISO storage domain for ISO images.

Figure 1:
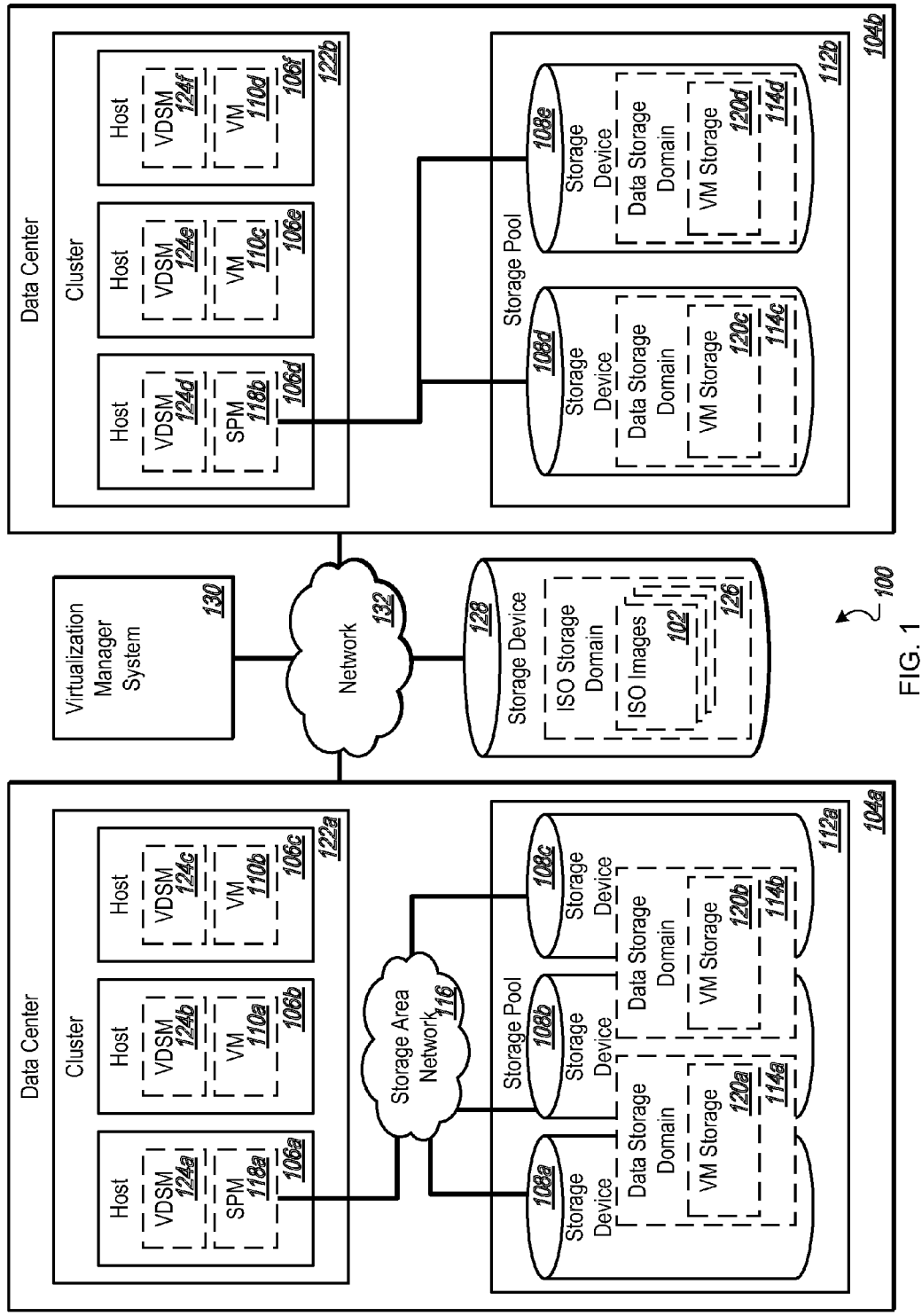
FIG. 1 is a schematic diagram that shows an example of a system for caching virtual machine installation images.

FIG. 1 is a schematic diagram that shows an example of a system 100 for caching virtual machine installation image files, such as one or more ISO images 102. The system 100 is an enterprise virtualization platform. The system 100 includes one or more data centers 104a-b. Each of the data centers 104a-b includes one or more hosts 106a-f and one or more storage devices 108a-e.

Each of the hosts 106a-f is a physical computing device, such as a server, that can each host one or more virtual machines 110a-d. A virtual machine (VM) is a virtual desktop or virtual server containing an operating system and a set of applications. Multiple identical desktops can be created in a pool of virtual machines at one or more of the hosts 106a-f. The virtual machines 110a-d can be accessed and used by end users. In some implementations, a user must have special permission to create, modify, or delete an instance of a virtual machine.

Each of the storage devices 108a-e is a physical storage device. Groups of the storage devices 108a-e form one or more storage pools 112a-b at each of the data centers 104a-b. Each of the storage pools 112a-b can include one or more data storage domains 114a-d. The data storage domains 114a-d can use a file based storage system and/or a block based storage system. For example, the data storage domains 114c-d in the second data center 104b use a file based storage system, such as Network File System (NFS), Internet Small Computer System Interface (iSCSI), and/or Fiber Channel Protocol (FCP). For file based storage, the storage devices 108d-e handle the storage of information within the data storage domains 114c-d. The data storage domains 114a-b in the first data center 104a use a block based storage system, such as a storage area network 116. The block based storage system allows the data storage domains 114a-b to be spread across multiple ones of the storage devices 108a-c at the first data center 104a.

Each of the data centers 104a-b includes one or more storage pool managers (SPMs) 118a-b. The storage pool managers 118a-b coordinate changes to storage metadata within a corresponding one of the storage pools 112a-b. Changes may include, for example, creating, deleting, and/or modifying one or more virtual machine storages (VM storages) 120a-d. In the case of the storage pool manager 118a at the first data center 104a, the changes may also include allocating block storage within the storage area network 116. Each of the storage pool managers 118a-b serves a corresponding cluster of hosts within the data centers 104a-b.

The data centers 104a-b each include one or more clusters 122a-b. Each of the clusters 122a-b is a set of physical hosts that are treated as a resource pool for a set of virtual machines. The hosts in a cluster can share the same network infrastructure and the same storage. Each of the clusters 122a-b is a migration domain within which virtual machines can be moved from host to host. For example, the virtual machine 110c within the second host 106e at the second data center 104b can be migrated to the first host 106d and/or the third host 106f within the cluster 122b at the second data center 104b. The storage pool manager 118a at the first data center 104a handles changes to the storage pool 112a associated with the cluster 122a at the first data center 104a. The storage pool manager 118b at the second data center 104b handles changes to the storage pool 112b associated with the cluster 122b at the second data center 104b.

Each of the virtual machine storages 120a-d within the storage pools 112a-b correspond to one of the virtual machines 110a-d. Each of the virtual machine storages 120a-d store the virtual instance of the operating system and applications for the corresponding one of the virtual machines 110a-d. Each of the hosts 106a-f has a corresponding one of multiple virtual desktop server managers (VDSMs) 124a-f. The virtual desktop server managers 124a-f manage the virtual machines in operation at the host associated with the virtual desktop server manager. For example, the virtual desktop server manager 124e in operation at the second host 106e at the second data center 104b manages the virtual machine 110c in operation at that host. The virtual desktop server managers 124a-f may manage virtual machines by selecting one of the ISO images 102 to be used for installing an instance of a virtual machine.

The system 100 stores the ISO images 102 in an ISO storage domain 126 provided by one or more storage devices 128. For example, a user at a virtualization manager system 130 may configure an ISO image for a particular type of host, storage, virtual operating system, virtual applications, and other configuration of a virtual machine. The virtualization manager system 130 may then send the ISO file over a network 132 for storage with the ISO images 102 in the ISO storage domain 126. The system 100 can share the ISO storage domain 126 and one or more of the ISO images 102 among the hosts 106a-f in the data centers 104a-b.

In some implementations, the ISO images 102 replace and/or represent logical Compact Discs (CDs) or other media (e.g., Digital Versatile Discs (DVDs), Blu-ray disc, and/or floppy disc media) used to install and boot the virtual operating system and the virtual applications within the virtual machine. In some implementations, storing the primary copies of the ISO images 102 in a centralized location allows the virtualization manager system 130 and/or other manager systems (e.g., one or more of the hosts 106a-f or a system separate from the data centers 104a-b) to manage updates to the ISO images 102 more easily. For example, centralizing the storage may prevent conflicting changes from being made to the ISO images 102 from multiple manager systems.

The virtual desktop server managers 124a-f and/or another component in operation at one or more of the hosts 106a-f cache one or more of the ISO images 102 and/or a list of one or more of the ISO images 102 within the data centers 104a-b. For example, the virtual desktop server manager 124a at the first host 106a in the first data center 104a may cache one or more of the ISO images 102 that are compatible with the hosts 106a-c and the storage pool 112a and/or the list of one or more of the ISO images 102 that are compatible. The virtual desktop server manager 124a may store the cached ISO images and/or list within the data storage domain 114a or another storage domain at the first data center 104a.

In some implementations, caching one or more of the ISO images 102 and/or the list of one or more of the ISO images 102 reduces the amount of time that the virtual desktop server managers 124a-f take to present a list of available ISO images to a user and/or the amount of time to create an instance of a virtual machine for an ISO image selected by a user. For example, the virtual desktop server manager 124a may cache one or more of the ISO images 102 and/or the list of one or more of the ISO images 102 at a time prior to a request from a user to present a list of available ISO images or to instantiate a virtual machine for a selected ISO image. By caching the ISO images and/or list ahead of time, the virtual desktop server manager 124a may remove the need for one or more trips over the network 132 to retrieve the ISO images and/or list from the ISO storage domain 126 at a time after a request is made by a user to present a list of available and compatible ISO images and/or a request by a user to instantiate a virtual machine for an ISO image selected by a user. In some implementations, caching the ISO images may reduce the number of requests sent to the ISO storage domain 126 for the ISO images 102.

The virtual desktop server managers 124a-f and/or other managers at the hosts 106a-f may cache one or more of the ISO images 102 and/or a list of one or more of the ISO images 102 periodically. For example, the virtual desktop server managers 124a-f may refresh their cached ISO images and/or lists every sixty minutes. In some implementations, the virtual desktop server managers 124a-f allow users to configure the period of time between refreshing the cached ISO images and/or lists.

The virtual desktop server managers 124a-f refresh their cached ISO images and/or lists on demand, such as in response to request by a user to refresh the cached ISO images and/or the list. In some implementations, the virtual desktop server managers 124a-f reset the time for periodically refreshing the cached ISO images and/or lists upon performing an on demand refresh of the cached ISO images and/or lists. In some implementations, the virtual desktop server managers 124a-f determine whether a refresh is already in progress before performing a periodic and/or on demand refresh. If a virtual desktop server manager determines that there is a refresh in progress, then the virtual desktop server manager may wait for the existing refresh to finish and/or cancel the new period and/or on demand refresh.

In some implementations, the virtual desktop server managers 124a-f refresh their cached ISO images and/or lists in response to a new ISO image being added to the ISO storage domain 126 and/or when the ISO storage domain 126 is activated. For example, a user at the virtualization manager system 130 may configure a new ISO image and/or activate the ISO storage domain 126. The virtualization manager system 130 may determine that the virtual desktop server managers 124a-f are configured to receive ISO images from the ISO storage domain 126 and, as a result, notifies each of the virtual desktop server managers 124a-f of the new ISO image and/or instructs the virtual desktop server managers 124a-f to refresh their cached ISO images and/or lists. In some implementations, the virtualization manager system 130 may determine whether the new ISO image is compatible with the physical hosts and storage pools of the virtual desktop server managers 124a-f and only notifies and/or requests refreshes from those ones of the virtual desktop server managers 124a-f that are compatible with the new ISO image.

When refreshing their cached ISO images and/or lists, the virtual desktop server managers 124a-f may compare, for example, names of the ISO images 102 in the ISO storage domain 126 to names in the cached ISO images and/or lists. In one example, each of the ISO images 102 has a name that includes a current version of the ISO image, and comparing the names includes comparing the versions of the ISO images 102 in the ISO storage domain 126 to the cached ISO images. In another example, the virtual desktop server managers 124a-f may also compare other metadata, such as other properties or attributes of the ISO images 102 (e.g., creation and/or modification dates, or version numbers stored in attributes). In yet another example, the virtual desktop server managers 124a-f may compare contents of the ISO images 102 to contents of the cached ISO images, such as by comparing the contents of an ISO image form the ISO storage domain 126 with a cached ISO image that have a matching name or other identifier.

The virtual desktop server managers 124a-f may remove cached ISO images from their caches as a result of refreshing their cached ISO images and/or list. For example, a virtual desktop server manager may determine that a cached ISO image with a particular name, identifier, and/or content no longer has a corresponding ISO image in the ISO storage domain 126 with that name, identifier, and/or content. The virtual desktop server manager may then remove the cached ISO image from the cache and/or from the list of ISO images. Alternatively, if a virtual desktop server manager determines that an ISO image with a particular name, identifier, and/or content exists in the ISO storage domain 126, but not in the cache for the virtual desktop server manager, then the virtual desktop server manager adds the ISO image to its cache and/or list of ISO images.

Figure 2:
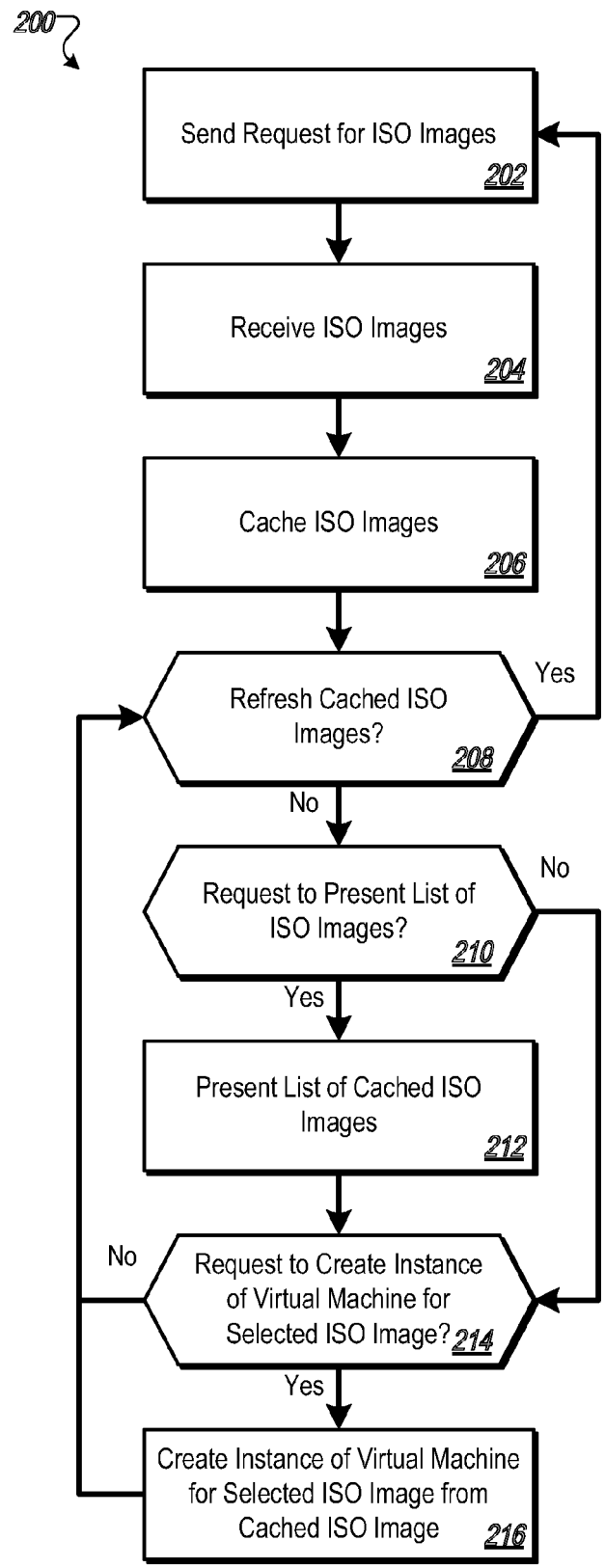
FIG. 2 is flow chart that shows an example of a process for caching virtual machine installation images.

FIG. 2 is flow chart that shows an example of a process 200 for caching installation image files. The process 200 may be performed, for example, by a system such as the system 100. For clarity of presentation, the description that follows uses the system 100 as an example for describing the process 200. However, another system, or combination of systems, may be used to perform the process 200.

The process 200 begins, at step 202, with sending, from a virtual desktop server manager at a data center and over a network, a request to a virtual machine storage domain for virtual machine installation images. The virtual machine storage domain stores the virtual machine installation images separate from the data center. In some implementations, the virtual machine installation images include ISO (International Organization for Standardization) images that conform to standards for an ISO file system, such as the ISO 9660 file system and/or the UDF file system. For example, one or more of the virtual desktop server managers 124a-f may send requests for the ISO images 102 to the ISO storage domain 126.

At step 204, the virtual machine installation images are received from the virtual machine storage domain over the network. For example, the virtual desktop server managers 124a-f may receive one or more of the ISO images 102 from the ISO storage domain 126 over the network 132.

At step 206, the virtual machine installation images are cached in a data storage domain within the data center. Caching may include adding one or more new virtual machine installation images to the cached virtual machine installation images that are in the virtual machine storage domain but not already in the data storage domain, replacing one or more existing virtual machine installation images in the cached virtual machine installation images with one or more modified virtual machine installation images from the virtual machine storage domain, and/or removing one or more previous virtual machine installation images from the cached virtual machine installation images that are no longer in the virtual machine storage domain. For example, the virtual desktop server managers 124b-c in the first data center 104a may cache ISO images in the data storage domains 114a-b, respectively, or another data storage domain within the first data center 104a. The virtual desktop server managers 124e-f in the second data center 104b may cache ISO images in the data storage domains 114c-d, respectively, or another data storage domain within the second data center 104b.

If, at step 208, it is determined that it is time to cache the virtual machine installation images again, then the process 200 includes performing steps 202, 204, and 206 again. Otherwise, the process 200 proceeds to step 210. For example, the process 200 may include periodically sending a request for, receiving, and caching the virtual machine installation images. In another example, the process 200 may include sending a request for, receiving, and caching the virtual machine installation images on demand. In yet another example, the process 200 may include sending a request for, receiving, and caching the virtual machine installation images upon activation of the virtual machine storage domain. In some implementations, the process 200 includes determining that an existing request, receipt, and cache operation of the virtual machine installation images is in progress, and in response to determining that the existing request, receipt, and cache operation is in progress, waiting to perform or canceling performance of a subsequent request, receipt, and cache operation of the virtual machine installation images.

If at step 210, a request to present a list of the virtual machine installation images is received, then, at step 212, the list of the cached virtual machine installation images is presented. Otherwise, the process proceeds to step 214. For example, the virtual desktop server manager 124e at the second data center 104b may receive a request from a user at a client computing device over the network 132 to present a list of ISO images available for instantiating the virtual machine 110c. The virtual desktop server manager 124e retrieves a list of the ISO images either from a list that is cached in the data storage domain 114c or by analyzing the ISO images cached in the data storage domain 114c. The virtual desktop server manager 124e then provides the list of the ISO images to the client computing device for presentation to the user at the client computing device.

If at step 214, a request to create an instance of a virtual machine from a selected one of the virtual machine installation images is received, then, at step 216, the instance of the virtual machine is created using the selected one of the virtual machine installation images from the cached virtual machine installation images. Otherwise, the process 200 returns to step 208. For example, the user at the client computing device can select an ISO image from the list of ISO images. The client computing device provides the selection to the virtual desktop server manager 124e. The virtual desktop server manager 124e retrieves the cached ISO image corresponding to the selection from the list and creates an instance of the selected ISO image for the virtual machine 110c at the host 106e. The virtual desktop server manager 124e may also create the virtual machine storage 120c in the data storage domain 114c while creating the instance of the selected ISO image.

Figure 3:
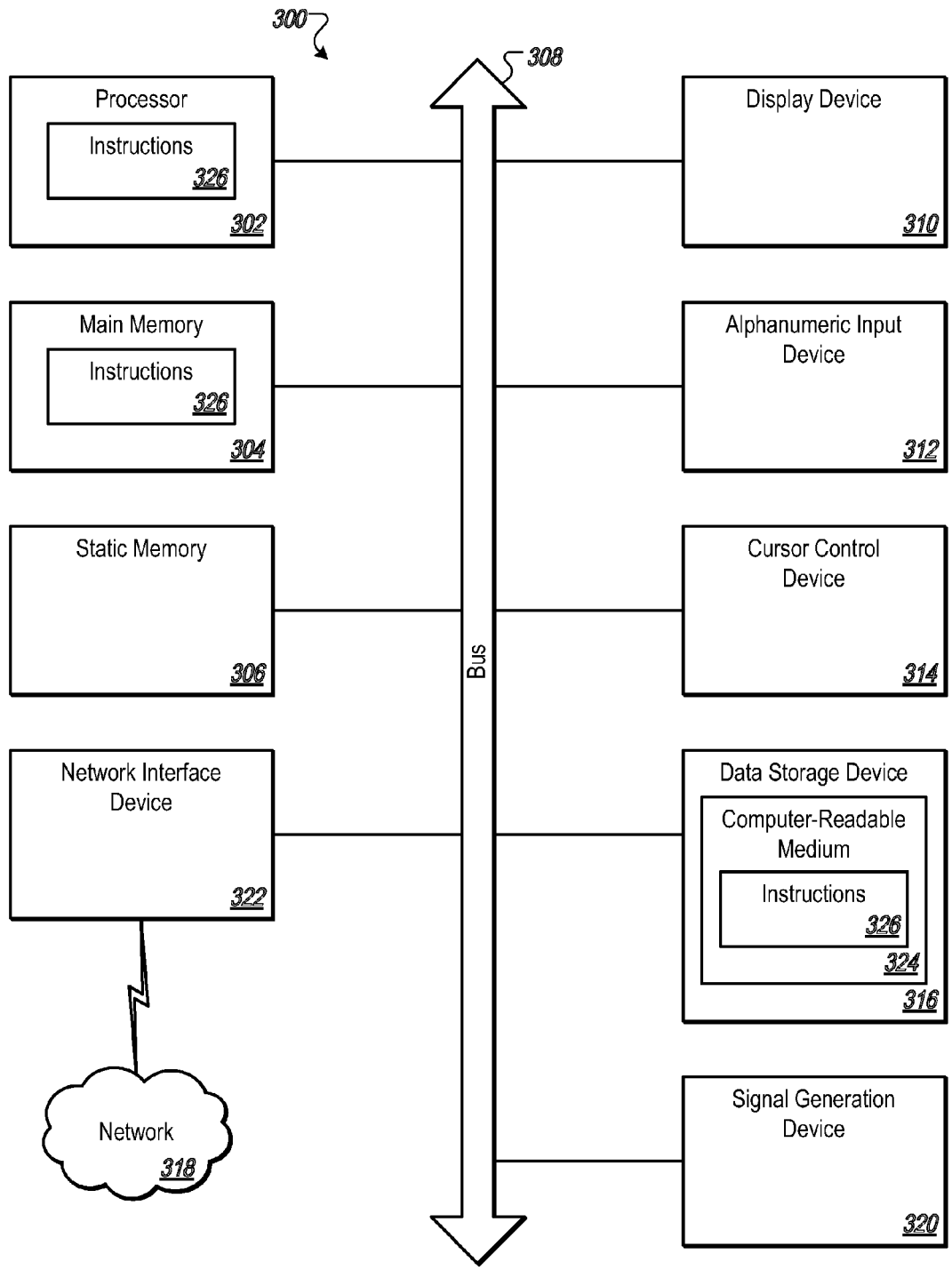
FIG. 3 is a schematic diagram that shows an example of a computing system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the hosts 106a-f, the storage devices 108a-e, the virtualization manager system 130, and/or the storage devices 128 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the hosts 106a-f, the storage devices 108a-e, the virtualization manager system 130, and/or the storage devices 128 embodying any one or more of the methodologies or functions described herein. The sets of instructions 326 of the hosts 106a-f, the storage devices 108a-e, the virtualization manager system 130, and/or the storage devices 128 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device that executes a virtual desktop server manager at a data center, that an existing operation is in progress for caching virtual machine installation images in a data storage domain within the data center from a virtual machine storage domain over a network, wherein the virtual machine storage domain stores the virtual machine installation images separate from the data center;

in response to determining that the existing operation is in progress, waiting to perform or canceling performance of a subsequent operation for caching the virtual machine installation images;

receiving a request to present a list of the virtual machine installation images that are cached in the data storage domain; and in response to receiving the request to present the list, presenting the list of the cached virtual machine installation images.

2. The method of claim 1, further comprising:

receiving a request to create an instance of a virtual machine from a selected one of the cached virtual machine installation images; and in response to receiving the request to create the instance, creating the instance of the virtual machine using the selected one of the cached virtual machine installation images.

3. The method of claim 2, wherein caching comprises:

adding one or more new virtual machine installation images to the cached virtual machine installation images from the virtual machine storage domain that are not already in the data storage domain;

replacing one or more existing virtual machine installation images in the cached virtual machine installation images with one or more modified virtual machine installation images from the virtual machine storage domain; and removing one or more previous virtual machine installation images from the cached virtual machine installation images that are no longer in the virtual machine storage domain.

4. The method of claim 2, wherein caching the virtual machine installation images comprises periodically caching the virtual machine installation images.

5. The method of claim 4, wherein caching the virtual machine installation images comprises caching the virtual machine installation images on demand.

6. The method of claim 5, wherein caching the virtual machine installation images comprises caching the virtual machine installation images upon activation of the virtual machine storage domain.

7. The method of claim 1, wherein the virtual machine installation images comprise ISO (International Organization for Standardization) images that conform to standards for an ISO file system.

8. A non-transitory computer-readable storage medium having instructions stored therein that, when executed by a processing device, cause the processing device to:

determine, by the processing device that executes a virtual desktop server manager at a data center, that an existing operation is in progress for caching virtual machine installation images in a data storage domain within the data center from a virtual machine storage domain over a network, wherein the virtual machine storage domain stores the virtual machine installation images separate from the data center;

in response to the determination that the existing operation is in progress, wait to perform or cancel performance of a subsequent operation for caching the virtual machine installation images;

receive a request to present a list of the virtual machine installation images that are cached in the data storage domain; and in response to the receipt of the request to present the list, present the list of the cached virtual machine installation images.

9. The non-transitory computer-readable storage medium of claim 8, wherein the instructions are further to cause the processing device to:

receive a request to create an instance of a virtual machine from a selected one of the cached virtual machine installation images; and in response to the receipt of the request to create the instance, create the instance of the virtual machine using the selected one of the cached virtual machine installation images.

10. The non-transitory computer-readable storage medium of claim 9, wherein the instructions are further to cause the processing device to cache virtual machine installation images by:

adding one or more new virtual machine installation images to the cached virtual machine installation images from the virtual machine storage domain that are not already in the data storage domain;

replacing one or more existing virtual machine installation images in the cached virtual machine installation images with one or more modified virtual machine installation images from the virtual machine storage domain; and removing one or more previous virtual machine installation images from the cached virtual machine installation images that are no longer in the virtual machine storage domain.

11. The non-transitory computer-readable storage medium of claim 9, wherein the instructions are to cause the processing device to cache the virtual machine installation images by periodically caching the virtual machine installation images.

12. The non-transitory computer-readable storage medium of claim 11, wherein the instructions are to cause the processing device to cache the virtual machine installation images by caching the virtual machine installation images on demand.

13. The non-transitory computer-readable storage medium of claim 12, wherein the instructions are to cause the processing device to cache the virtual machine installation images by caching the virtual machine installation images upon activation of the virtual machine storage domain.

14. The non-transitory computer-readable storage medium of claim 8, wherein the virtual machine installation images comprise ISO (International Organization for Standardization) images that conform to standards for an ISO file system.

15. A system comprising:

a data storage domain within a data center; and a processing device to execute a virtual desktop server manager at the data center to:

determine that an existing operation is in progress for caching virtual machine installation images in the data storage domain from a virtual machine storage domain over a network, wherein the virtual machine storage domain stores the virtual machine installation images separate from the data center;

in response to the determination that the existing operation is in progress, wait to perform or cancel performance of a subsequent operation for caching the virtual machine installation images;

receive a request to present a list of the virtual machine installation images that are cached in the data storage domain; and in response to the receipt of the request to present the list, present the list of the cached virtual machine installation images.

16. The system of claim 15, wherein the virtual desktop server manager is further to:
- receive a request to create an instance of a virtual machine from a selected one of the cached virtual machine installation images; and
- in response to the receipt of the request to create the instance, create the instance of the virtual machine using the selected one of the cached virtual machine installation images.

17. The system of claim 16, wherein the virtual desktop server manager is further to cache virtual machine installation images by:
- adding one or more new virtual machine installation images to the cached virtual machine installation images from the virtual machine storage domain that are not already in the data storage domain;
- replacing one or more existing virtual machine installation images in the cached virtual machine installation images with one or more modified virtual machine installation images from the virtual machine storage domain; and
- removing one or more previous virtual machine installation images from the cached virtual machine installation images that are no longer in the virtual machine storage domain.

18. The system of claim 16, wherein the virtual desktop server manager caches the virtual machine installation images by periodically caching the virtual machine installation images.

19. The system of claim 18, wherein the virtual desktop server manager caches the virtual machine installation images by caching the virtual machine installation images on demand.

20. The system of claim 19, wherein the virtual desktop server manager caches the virtual machine installation images by caching the virtual machine installation images upon activation of the virtual machine storage domain.

21. The system of claim 15, wherein the virtual machine installation images comprise ISO (International Organization for Standardization) images that conform to standards for an ISO file system.

* * * * *